(12) United States Patent
Sun et al.

(10) Patent No.: US 10,966,084 B2
(45) Date of Patent: Mar. 30, 2021

(54) FINE TIMING MEASUREMENT SECURITY WITH DISTANCE BOUNDING PROTOCOL

(71) Applicants: Sheng Sun, Ottawa (CA); Kwok Shum Au, Ottawa (CA)

(72) Inventors: Sheng Sun, Ottawa (CA); Kwok Shum Au, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 255 days.

(21) Appl. No.: 16/120,541

(22) Filed: Sep. 4, 2018

(65) Prior Publication Data

US 2019/0075461 A1 Mar. 7, 2019

Related U.S. Application Data (60) Provisional application No. 62/554,390, filed on Sep. 5, 2017.

(51) Int. Cl.
  *G06F 21/44* (2013.01)
  *H04L 9/32* (2006.01)
  (Continued)

(52) U.S. Cl.
  CPC ............ *H04W 12/06* (2013.01); *H04L 9/0643* (2013.01); *H04L 9/085* (2013.01); *H04L 9/3226* (2013.01);
  (Continued)

(58) Field of Classification Search
  CPC .................................. H04L 9/32; G06F 21/44
  See application file for complete search history.

(56) References Cited

U.S. PATENT DOCUMENTS

2015/0319631 A1  11/2015 Aldana et al.
2015/0341750 A1  11/2015 Hayes et al.
(Continued)

FOREIGN PATENT DOCUMENTS

CN   105101405 A    11/2015
WO   2015134741 A1   9/2015

OTHER PUBLICATIONS

Ioana Boureanu et al., "Towards Secure Distance Bounding", Moriai S. (eds) Fast Software Encryption, FSE 2013, Lecture Notes in Computer Science, vol. 8424. Springer, Berlin, Heidelberg.
(Continued)

*Primary Examiner* — Izunna Okeke (57) ABSTRACT

System and method using distance bounding to provide security in fine timing measurement (FTM) communications including authenticating a prover device at a verifier device, including: transmitting from a verifier device, through the wireless interface, a sequence of challenge bits for a prover device, each challenge bit being transmitted in a respective FTM frame; receiving, at the verifier device, FTM acknowledgment frames; determining, for at least some of the received FTM acknowledgement frames, respective round trip time (RTT) measurements; determining, for at least some of the received FTM acknowledgement frames, whether the included response bit matches a predicted response bit; and authenticating the prover device based on the determined RTT measurements and the determined response bit matches.

19 Claims, 9 Drawing Sheets

(51) Int. Cl.
  *H04W 12/06* (2021.01)
  *H04W 4/02* (2018.01)
  *H04L 9/06* (2006.01)
  *H04L 9/08* (2006.01)
  *H04L 29/06* (2006.01)

(52) U.S. Cl.
  CPC .......... *H04L 9/3236* (2013.01); *H04L 9/3242* (2013.01); *H04L 9/3271* (2013.01); *H04L 63/0876* (2013.01); *H04W 4/023* (2013.01); *H04L 2209/805* (2013.01)

(56) References Cited

U.S. PATENT DOCUMENTS

2016/0249165 A1    8/2016  Aldana
2017/0149799 A1*   5/2017  Vamaraju ............... G01S 13/767

OTHER PUBLICATIONS

Gerhard P. Hancke et al., "An RFID Distance Bounding Protocol", First International Conference on Security and Privacy for Emerging Areas in Communications Networks (SECURECOMM'05), Sep. 2005.
11-16-1020-00-00az, Qi Wang et al , Security enhancement to FTM Jul. 25, 2016.

* cited by examiner

FIG. 1

FTM Request Frame 202

| Category | Public Action | Trigger | FDB Nonce 204 | LCI Measurement (Optional) | Location Civic Measurement Request (Optional) | Fine Timing Measurement Paramaters (Optional) |
|---|---|---|---|---|---|---|
| 1 | 1 | 1 | 4 or 6 | variable | variable | variable |

Octets:

FINE TIMING MEASUREMENT SECURITY WITH DISTANCE BOUNDING PROTOCOL

RELATED APPLICATIONS

This Application claims the benefit of and priority to U.S. Provisional Patent Application No. 62/554,390 filed Sep. 5, 2017, entitled "Fine Timing Measurement Security with Distance Bounding Protocol" the contents of which are incorporated by reference herein in their entirety.

TECHNICAL FIELD

The present disclosure relates to security for timing measurement protocols in wireless communications.

BACKGROUND

Fine Timing Measurement (FTM) has been adopted into the IEEE 802.11 group of standards to enable location determination between devices that communicate using an air interface, including for example between devices that use local area networks (WLANs) such as Wi-Fi networks. FTM can be applied in a number of use cases, including direct communications between wearable devices and smart phones, RFID based access systems, contactless payment systems and other proximity or location based systems.

FTM security has been considered in the context of a variety of use cases, and many FTM security solutions are based on the Diffie-Hellman (DH) protocol or its related DH with Ephemeral keys (DHE) protocol. The DH and DHE protocols require that a pair of communicating devices both be enabled to support the relevant DH cryptographic functions, which can require relatively substantial computational resources and a pre-established security association between the two devices.

Another proximity based protocol is the Distance Bounding (DB) protocol. A DB protocol is described, for example, in Ioana Boureanu et al., "Towards Secure Distance Bounding" FSE 2013 (https://infoscience.epfl.ch/record/186878/files/ski-fsel3.pdf), which references the Hanke and Kuhn protocol described in Gerhard P. Hancke, Markus G. Kuhn, "An RFID Distance Bounding Protocol", Proceedings of IEEE/Create-Net SecureComm2005, 5-9 Sep. 2005, Athens, Greece, pp. 67-73. IEEE Computer Society Press, Los Alamitos, Calif., USA, ISBN 0-7695-2369-2. DB protocol typically requires fewer computational resources than DH based protocols.

As described in the above papers, proximity based protocols can be subjected to a variety of security challenges, including for example the relay/replay/man-in-middle attack, distance fraud, and mafia fraud.

Accordingly, there is a need for a system for securely enabling two devices to provide proximity based exchanges with each other in a computationally efficient manner.

SUMMARY

The present disclosure presents a method and system that combines aspects of FTM and DB to enable a level of security and authentication between two communicating devices that is computationally efficient and sufficiently secure for many types of exchanges. In some examples, the described methods and systems can be applied to devices that are not pre-associated with each other. According to a first example aspect, a method for authenticating an electronic device is disclosed that includes transmitting from a verifier device, through the wireless interface, a sequence of challenge bits for a prover device, each challenge bit being transmitted in a respective FTM frame and, receiving, at the verifier device, FTM acknowledgment frames. The method include determining respective round trip time (RTT) measurements for at least some of the received FTM acknowledgement frames, and determining, for at least some of the received FTM acknowledgement frames, whether the included response bit matches a predicted response bit. The prover device is authenticated based on the determined RTT measurements and the determined response bit matches.

Some embodiments of the first aspect include determining if an unexpected FTM acknowledgement frame is received at the verifier device, wherein authenticating the prover device is also based on whether the unexpected acknowledgement frame is received.

In some embodiments, a randomly including a skip bit is randomly included in at least one of the FTM frames that includes one of the challenge bits, wherein the verifier device will determine that a received FTM acknowledgement frame is unexpected if the received FTM acknowledgement frame is received in response to the FTM frame that included the skip bit.

In some examples embodiments, the verifier device will determine that a received FTM acknowledgement frame is unexpected if predetermined criterion exist based on a current location in the sequence of challenge bits.

In some example embodiments of the first aspect, the predicted response sequence is calculated based on a keyed hash function combining the first nonce and the second nonce, wherein secret keys are shared between the verifier device and the prover device.

In some example embodiments of the first aspect, the predicted response sequence is calculated based on a pseudo-random hash function combining the first nonce and the second nonce, wherein the verifier device and the prover device are not pre-associated with secret keys.

In some example embodiments, the method includes calculating at the verifying device a authentication challenge sequence based on at least some of the challenge bits and received response bits, and including the authentication challenge sequence in a designated field of one the FTM frames transmitted for the prover device, the method further including monitoring at the verifying device for a corresponding FTM acknowledgement frame.

In some example embodiments of the first aspect, the response sequence is stored using two shift registers, and the challenge bit is used to identify one or the other of the shift registers.

In some example embodiments, the method includes, prior to transmitting the sequence of challenge bits from the verifier device: receiving at the verifier device, through a wireless interface, a fine timing measurement (FTM) request frame that includes a first nonce from the prover device; and generating a second nonce and transmitting from the verifying device, through the wireless interface, the second nonce in an FTM acknowledgment frame for the prover device. In some examples, the method includes calculating and storing at the verifying device a sequence of the predicted response bits.

According to a second example aspect, a processing system is disclosed, The processing system is at a verifier device and is configured to authenticate a prover device. The processing system includes a processing device, a memory associated with the processing device, and a non-transient storage for storing instructions that when loaded to the memory and executed by the processing device cause the processing device to: receive at the verifier device, through a wireless interface, a fine timing measurement (FTM) request frame that includes a first nonce from the prover device; generate a second nonce and transmit from the verifying device, through the wireless interface, the second nonce in an FTM acknowledgment frame for the prover device; calculate and store at the verifying device a predicted response sequence based on a combination of the first nonce and the second nonce; transmit from the verifier device, through the wireless interface, a sequence of challenge bits for the prover device, each challenge bit being transmitted in a respective FTM frame; monitor at the verifier device for FTM acknowledgment frames received by the verifier device through the wireless interface that include response bits based on the transmitted challenge bits; determine, for at least some of the received FTM acknowledgement frames, respective round trip time (RTT) measurements that corresponds to a duration for the prover device to reply to the respective FTM frames; determine, for at least some of the received FTM acknowledgement frames, if the included response bit matches a predicted response bit from the predicted response sequence; and authenticate the prover device based on the determined RTT measurements and the determined response bit matches.

According to an third example aspect, there is described a non-transitory machine readable medium having tangibly stored thereon executable instructions that, when executed by a processor of a verifier device cause the processor to perform the method of: receiving at the verifier device, through a wireless interface, a fine timing measurement (FTM) request frame that includes a first nonce from a prover device; generating a second nonce and transmitting from the verifying device, through the wireless interface, the second nonce in an FTM acknowledgment frame for the prover device; calculating and storing at the verifying device a predicted response sequence based on a combination of the first nonce and the second nonce; transmitting from the verifier device, through the wireless interface, a sequence of challenge bits for the prover device, each challenge bit being transmitted in a respective FTM frame; monitoring at the verifier device for FTM acknowledgment frames received by the verifier device through the wireless interface that include response bits based on the transmitted challenge bits; determining, for at least some of the received FTM acknowledgement frames, respective round trip time (RTT) measurements that corresponds to a duration for the prover device to reply to the respective FTM frames; determining, for at least some of the received FTM acknowledgement frames, if the included response bit matches a predicted response bit from the predicted response sequence; and authenticating the prover device based on the determined RTT measurements and the determined response bit matches.

According to a fourth example aspect a methods is described for authenticating a prover device. The method includes, at the prover device: generating a first nonce and transmitting, through a wireless interface, the first nonce in a fine timing measurement (FTM) request frame for a verifier device; receiving, through the wireless interface, an FTM acknowledgment frame that includes a second nonce from the verifier device; calculating and storing at the prover device a response sequence based on a combination of the first nonce and the second nonce; receiving from the verifier device, through the wireless interface a sequence of FTM frames that each include a respective challenge bit; and transmitting FTM acknowledgment frames for the verifier device through the wireless interface, each FTM acknowledgment frame corresponding to one of the FTM frames and including a respective response bit selected from the response sequence based on the challenge bit included in the corresponding FTM frame.

According to some example embodiments of the fourth aspect, the method includes selectively not transmitting an FTM acknowledgement frame corresponding to an FTM frame upon detecting information in the FTM frame indicating that a corresponding FTM acknowledgement frame should not be sent. In some examples, the information is indicated by a bit in the FTM frame.

According to some example embodiments of the fourth aspect, the method includes selectively not transmitting an FTM acknowledgement frame corresponding to an FTM frame upon detecting the existence of predetermined criterion based on the received challenge bits and the response bits.

According to some example embodiments of the fourth aspect, the predicted response sequence is calculated based on a keyed hash function combining the first nonce and the second nonce, wherein a secret key is shared between the verifier device and the prover device.

According to some example embodiments of the fourth aspect the predicted response sequence is calculated based on a pseudo-random hash function combining the first nonce and the second nonce, wherein the verifier device and the prover device are not pre-associated with secret keys.

According to some example embodiments of the fourth aspect, the method includes calculating at the proving device a authentication challenge sequence based on at least some of the challenge bits and response bits, and determining if the calculated authentication challenge sequence matches a sequence present in a designated field of one the FTM frames received from the verifier device.

According to example embodiments of the fourth aspect the response sequence is stored using two shift registers, and the challenge bit is used to identify one or the other of the shift registers.

According to a fifth example aspect, there is provided a processing system at a prover device, including: a processing device; a memory associated with the processing device; a non-transient storage for storing instructions that when loaded to the memory and executed by the processing device cause the processing device to: generate a first nonce and transmit, through a wireless interface, the first nonce in a fine timing measurement (FTM) request frame for a verifier device; receive, through the wireless interface, an FTM acknowledgment frame that includes a second nonce from the verifier device; calculate and store at the prover device a response sequence based on a combination of the first nonce and the second nonce; receive from the verifier device, through the wireless interface a sequence of FTM frames that each include a respective challenge bit; and transmit FTM acknowledgment frames for the verifier device through the wireless interface, each FTM acknowledgment frame corresponding to one of the FTM frames and including a respective response bit selected from the response sequence based on the challenge bit included in the corresponding FTM frame.

According to a sixth example aspect, there is provided a transitory machine readable medium having tangibly stored thereon executable instructions that, when executed by a processor of a prover device cause the processor to perform the method of: generating a first nonce and transmitting, through a wireless interface, the first nonce in a fine timing measurement (FTM) request frame for a verifier device; receiving, through the wireless interface, an FTM acknowledgment frame that includes a second nonce from the verifier device; calculating and storing at the prover device a response sequence based on a combination of the first nonce and the second nonce; receiving from the verifier device, through the wireless interface a sequence of FTM frames that each include a respective challenge bit; and transmitting FTM acknowledgment frames for the verifier device through the wireless interface, each FTM acknowledgment frame corresponding to one of the FTM frames and including a respective response bit selected from the response sequence based on the challenge bit included in the corresponding FTM frame.

According to a further example aspect is a method for authenticating a prover device at a verifier device, comprising: receiving at the verifier device, through a wireless interface, a fine timing measurement (FTM) request frame that includes a first nonce from the prover device; generating a second nonce and transmitting from the verifying device, through the wireless interface, the second nonce in an FTM acknowledgment frame for the prover device; calculating and storing at the verifying device a predicted response sequence based on a combination of the first nonce and the second nonce; transmitting from the verifier device, through the wireless interface, a sequence of challenge bits for the prover device, each challenge bit being transmitted in a respective FTM frame; monitoring at the verifier device for FTM acknowledgment frames received by the verifier device through the wireless interface that include response bits based on the transmitted challenge bits; determining, for at least some of the received FTM acknowledgement frames, respective round trip time (RTT) measurements that corresponds to a duration for the prover device to reply to the respective FTM frames; determining, for at least some of the received FTM acknowledgement frames, if the included response bit matches a predicted response bit from the predicted response sequence; and authenticating the prover device based on the determined RTT measurements and the determined response bit matches.

A verifier device for performing the above method is provided according to example aspects. A corresponding prover device for receiving the frames noted in the above method is also provided according to example aspects.

BRIEF DESCRIPTION OF THE DRAWINGS

Reference is now made to the following description taken in conjunction with the accompanying drawings, in which.

DETAILED DESCRIPTION OF ILLUSTRATIVE EMBODIMENTS

The present disclosure presents a method and system that incorporates aspects of distance bounding (DB) into communications that use Fine Timing Measurement (FTM) for location determination.

Figure 1:
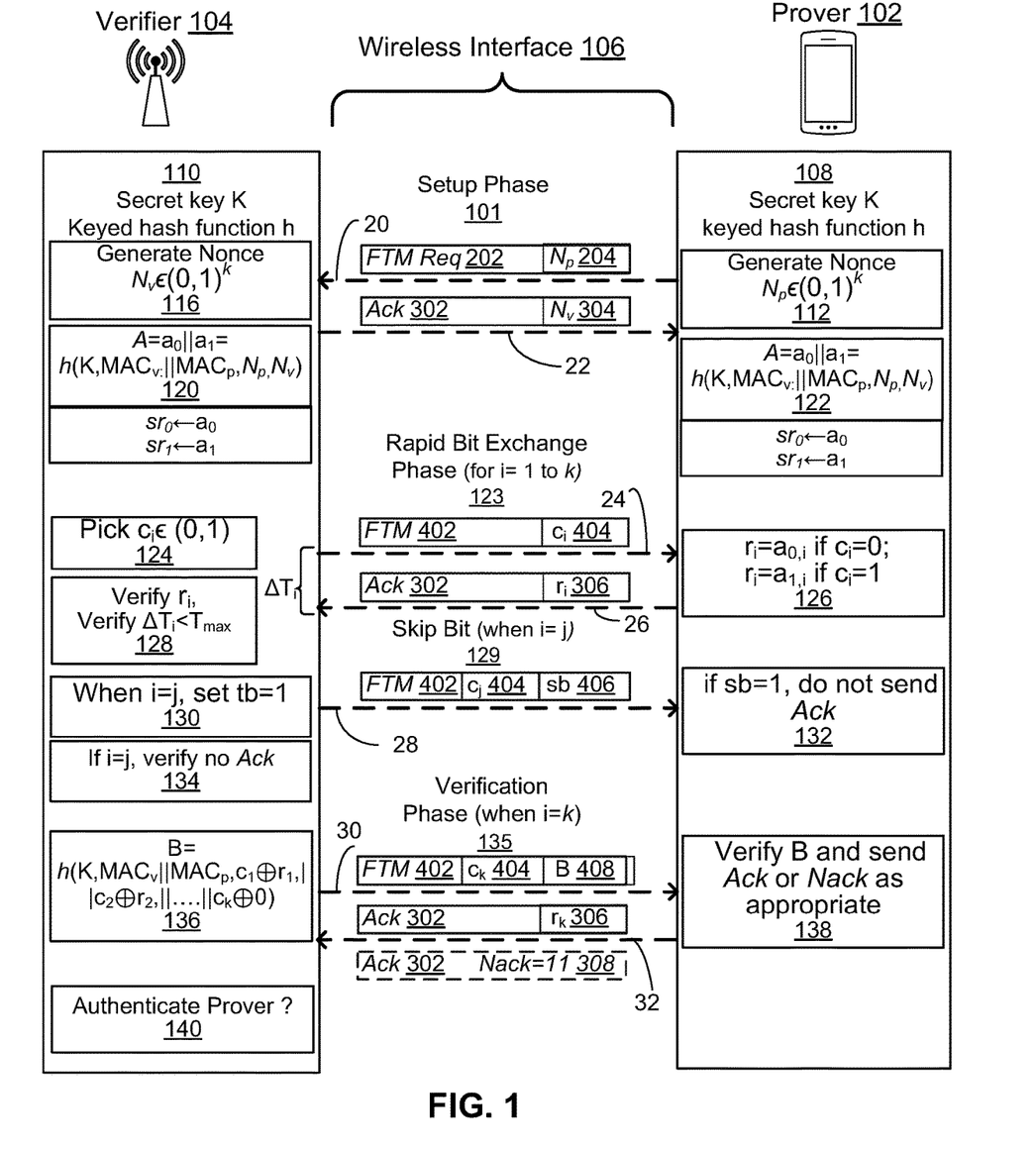
FIG. 1 is a signalling flow diagram illustrating signals exchanged between and actions taken at a verifier device and a prover device according to example embodiments.

In this regard, FIG. 1 is a signalling flow diagram illustrating signals exchanged directly between a prover device 102 and a verifier device 104. Prover device 102 and verifier device 104 are enabled to communicate with each other using a predetermined FTM protocol through a wireless interface 106. Wireless interface 106 may for example include one or more channels of unlicensed spectrum, and may include (but is not limited to) spectrum used for WLAN (including Wi-Fi) communications. In example embodiments, prover device 102 is an electronic device that incorporates one or more of a user station, smartphone, wearable device, electronic payment device, RFID security device, laptop, tablet, automotive anti-collision device, and any other form of electronic device that can be used in a proximity based system. In example embodiments, verifier device 104 is an electronic device or network element that incorporates one or more of a network access point, server, station, smartphone, electronic payment terminal, RFID security authentication terminal, laptop, tablet, automotive anti-collision device, and any other form of verification device that can be used in a proximity based system.

In the embodiment shown in FIG. 1, prover device 102 and verifier device 104 are pre-associated devices in that they each share a secret key K, and are enabled to apply a keyed hash function h, for example a Cipher-based Message Authentication Code (CMAC) based hash function.

In example embodiments, communications between the devices 102 and 104 through wireless interface 106 are carried out using frames that conform to a predetermined FTM protocol. In one example, the frames are modified versions of the FTM frames defined in IEEE 802.11™-2016 (hereinafter the "IEEE 802.11 standard"). As will described in further detail below, the FTM frames have been modified to support a DB protocol to provide enhanced authentication between the prover device 102 and the verifier device 104.

Figure 2:
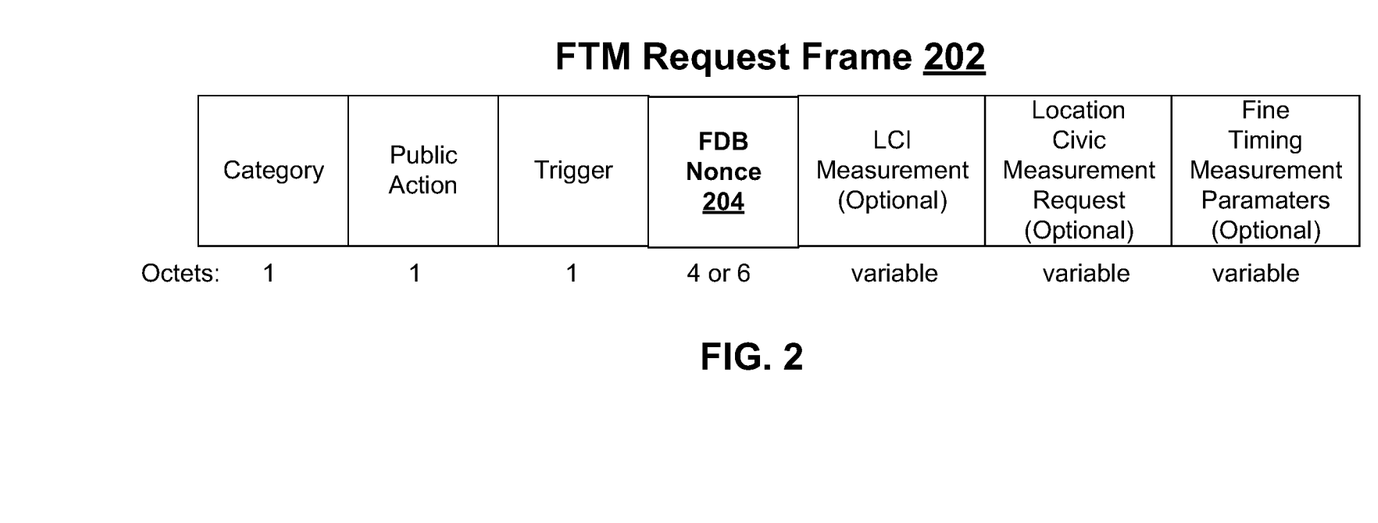
FIG. 2 illustrates a format of a FTM request frame according to an example embodiment.

In FIG. 1, block 108 identifies a group of actions executed at prover device 102 and block 110 identifies a group of actions of actions executed at verifier device 104 to support an exchange of wireless signals across the wireless interface 106 according to an example embodiment of the presently described DB enabled FTM method. The FTM method shown in FIG. 1 includes an initial setup phase 101 during which an FTM request frame 202 that includes a fine distance bounding (FDB) nonce field 204 is included in a signal 20 transmitted by prover device 102 and received and acknowledged by verifier device 104. An example format for FTM request frame 202 is shown in FIG. 2, which is similar to the FTM request frame defined in the above noted IEEE 802.11 standard, with the exception that the FTM request frame 202 also includes an FDB nonce field 204. In the example of FIG. 2, FDB nonce field 204 can be 4 or 6 octets in length, or any integer number of octets. As illustrated by block 112 in FIG. 1, the prover device 102 is configured to generate a prover device nonce $N_p$ that includes k bits (for example, k=32 or k=48). Each bit is assigned a "1" or "0" to provide a random sequence of k binary bits. The prover device 102 includes nonce $N_p$ in the FDB nonce field 204 of the FTM request frame 202 that it transmits as signal 20.

Figure 3:
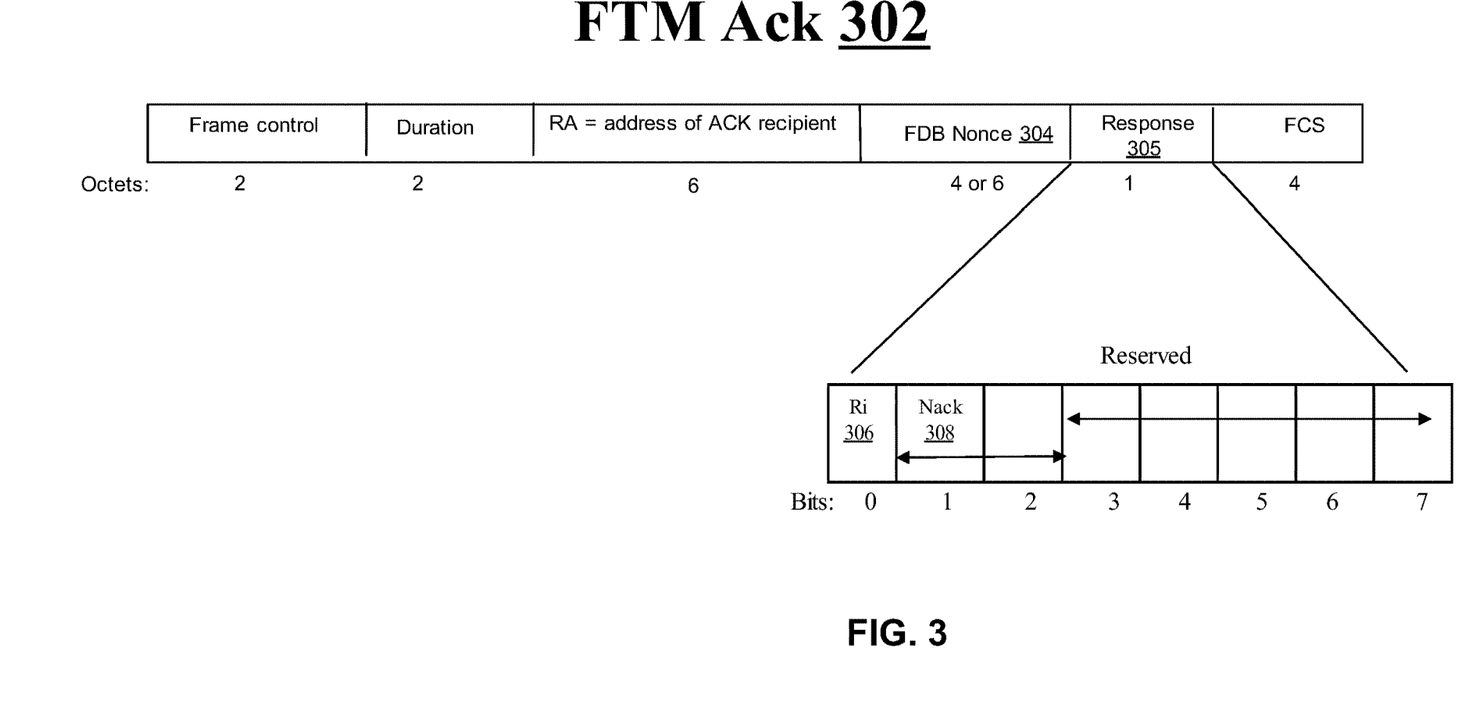
FIG. 3 illustrates a format of a FTM ACK frame according to an example embodiment.

The verifier device 104 receives signal 20 and decodes FTM request frame 202 to acquire the prover device nonce $N_p$ and any other information included in the FTM request frame 202. Similarly, the verifier device 104 is also configured to generate a respective verifier device nonce $N_v$ that include k bits. Each bit is assigned a "1" or "0" to form a random binary bit sequence. The verifier device 104 includes its generated nonce $N_v$ in an FDB nonce field 304 of an FTM acknowledgement frame 302 that it transmits as signal 22. In this regard, an example format for FTM acknowledgement frame 302 is shown in FIG. 3. FTM acknowledgement frame 302 is similar to the FTM acknowledgement frame defined in the above noted IEEE 802.11 standard, with the following notable differences. Namely, the FTM request frame 302 also includes a fine distance bounding (FDB) nonce field 304 and a response field 305 that includes a response bit subfield 306 and a NACK subfield 308 (which will both be described below). In the example of FIG. 3, FDB nonce field 304 can be 4 or 6 octets in length, and response field 306 is 1 octet, with response bit subfield 306 being 1 bit and NACK subfield 308 being 2 bits.

As noted above, in the embodiment of FIG. 1, both of the devices 102 and 104 have a pre-shared key K. As part of the setup phase, as shown in blocks 122 and 120, respectively, the prover device 102 and the verifier device 104 each calculate an identical response bit sequence A using the pre-shared key K. In one example, the keyed hash function h is applied to a combination of the verifier device 104 medium access control (MAC) address $MAC_v$, the prover device 102 MAC address $MAC_p$, the prover device 102 nonce $N_p$, and the verifier device 104 nonce $N_v$, as represented in one non-limiting example by the relationship: $A=a_0\|a_1=h(K,MAC_v\|MAC_p,N_p,N_v)$. As illustrated, the resulting 2 k bit sequence is divided into two halves, $a_0$ and $a_1$, and each 2 k/2 bit=k bit long sequence is stored in a respective shift register $sr_0$, $sr_1$. Accordingly, at the completion of setup phase 101 each of the verifier device 104 and prover device 102 has a respective set of first and second shift registers $sr_0$, $sr_1$, with the first shift registers $sr_o$ at the verifier device 104 and prover device 102 each loaded with the identical bit sequence $a_0$ and the second shift registers $sr_1$ at the verifier device 104 and prover device 102 each loaded with the identical bit sequence $a_1$.

A rapid bit exchange phase 123 follows the setup phase 101, during which the verifier device 104 sends a series of k challenge bits $c_i$ in respective FTM action frames 402 to the prover device 102 with inclusion of $c_i$ bit 404 (e.g., a respective challenge bit $c_i$ 404 is included in each action frame 402) and receives response bit $r_i$ in respective FTM acknowledgement frames 302 with inclusion of $r_i$ bit 306 (e.g., a respective response bit $r_i$ is included in each acknowledgement frame 302). In example embodiments the FTM action frames 402 are transmitted by verifier device 104 as a set of quick multiple frame bursts. For example, in one non-limiting embodiment where k=16, four sets of multiple frame bursts can be transmitted, with each burst containing four frames 402, with each frame 402 within a burst having a gap delay of no more than 10 ms (i.e. gap_max<=10 ms) from the previous frame 402 in the burst. In the example of k=32, eight sets of four-frame bursts can be transmitted, and in the example of k=64, sixteen sets of four-frame bursts can be transmitted. In an example embodiment, the FTM setting ASAP is set equal to 1 for the rapid bit exchange phase 123. ASAP=1 is an FTM setting that indicates that the requesting device (for example prover device 102) is requesting that the first burst instance of the FTM session occur as soon as possible.

Figure 4:
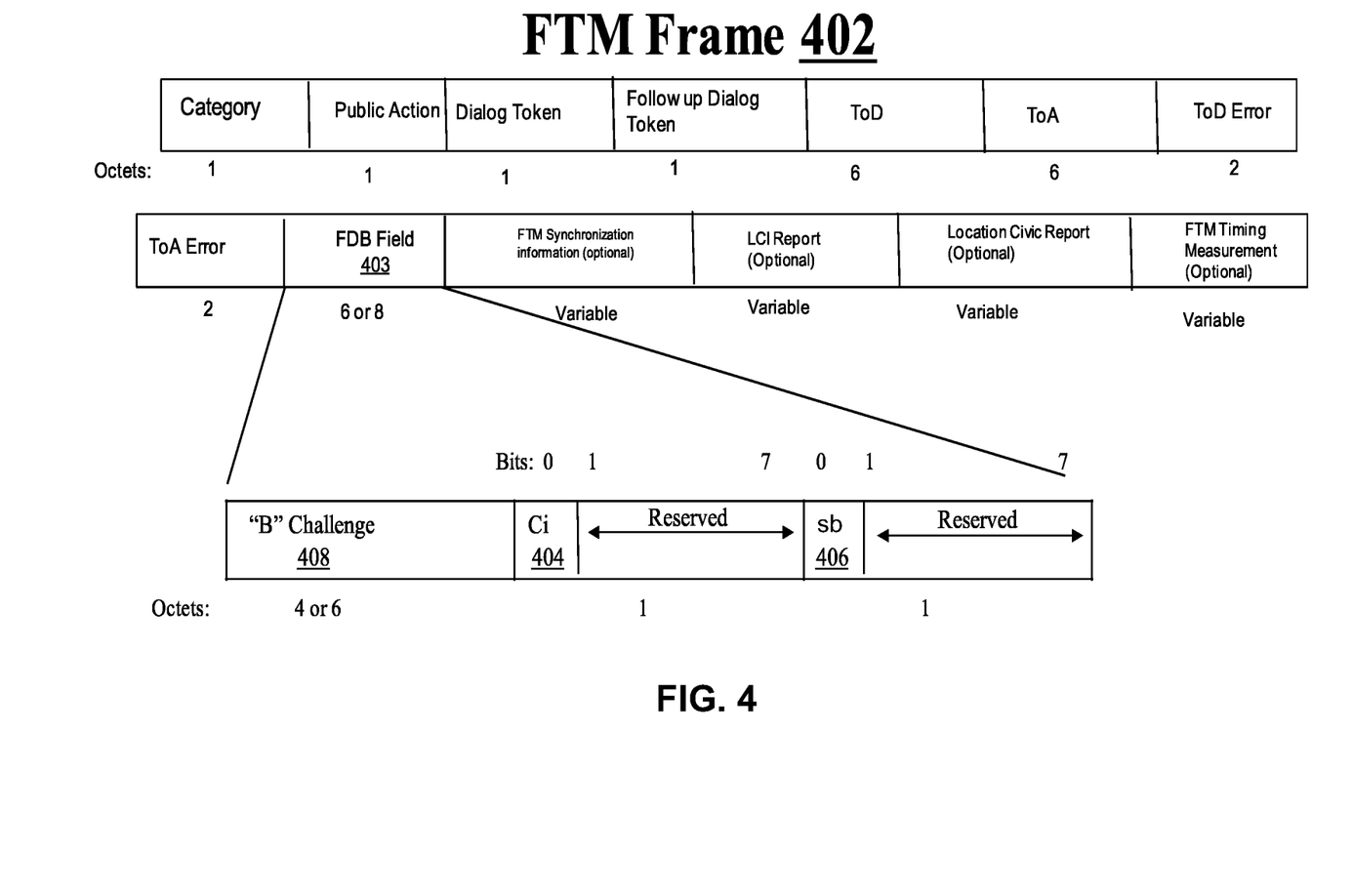
FIG. 4 illustrates a format of a FTM frame according to an example embodiment.

As shown in FIG. 1, each of the k rapid bit exchanges starts with the verifier device 104 randomly selecting challenge bit $c_i$ as either a "0" or "1" (block 124), and then including the challenge bit $c_i$ in a challenge bit $c_i$ sub-field 404 of FTM action frame 402. FTM action frame 402 is transmitted by verification device 104 as signal 24 to prover device 102. An example format for FTM action frame 402 is shown in FIG. 4, which is similar to the FTM action frame defined in the above noted IEEE 802.11 standard, with the exception that the FTM action frame 402 also includes a FDB field 403 that includes the challenge bit $c_i$ sub-field 404. Furthermore, as will be explained in greater detail below, in some example embodiments, the FDB field 403 also includes a mutual authentication "B" challenge sub-field 408 and a skip bit sb challenge field 406. In the illustrated example, FDB field is 6 or 8 octets in length, with 4 or 6 octets designated for the mutual authentication "B" challenge field 408, and 1 bit designated for each of the challenge bit $c_i$ sub-field 404 and the skip bit sb challenge field 406.

When the signal 24 is received at prover device 102, the challenge bit $c_i$ is extracted from the received FTM action frame 402 and used to select an appropriate response bit $r_i$ from one of the two shift registers $sr_0$, $sr_1$ (Block 126). In one example embodiment, the challenge bit $c_i$ is used to designate which of the respective shift registers $sr_0$, $sr_1$ to obtain the response bit $r_i$ from, with the prover device 102 using the next available bit in the designated shift register such that the response bit $r_i=a_{0,i}$ if challenge bit $c_{1,i}=0$ and the response bit $r_i=a_{1,i}$ if challenge bit $c_i=1$. Accordingly, the selected response bit depends on the value of the challenge bit $c_i$ as well as how far into the response bit sequence the rapid bit exchange has progressed.

The prover device 102 includes the selected response bit $r_i$ in a response bit field 306 of the FTM acknowledgement frame 302 which is transmitted as signal 28. As noted above, and shown in FIG. 3, in example embodiments the FTM acknowledgement frame 302 is a modified version of the FTM ACK frame defined in the above mentioned IEEE 802.11 standard. In one example, the response bit field 306 is an octet in length, with one bit being reserved for the response bit $r_i$ and 7 bits reserved for future designations.

When the signal 26 is received at verifier device 104, the response bit $r_i$ is extracted from the received FTM acknowledgment frame 302. Furthermore, the verifier device 104 measures the round-trip time (RTT) $\Delta T_i$ between sending the FTM action frame 402 that includes challenge bit $c_i$ and receiving the FTM acknowledgment frame 302 that includes response bit $r_i$. As indicated in block 128, the verifier device performs two verification calculations: (i) the verifier device 104 confirms that the received response bit $r_i$ is the correct response bit based on its own local shift registers $sr_0,sr_1$ and the known value of the challenge bit $c_i$; and (ii) the verifier device 104 confirms that the RTT $\Delta T_i$ falls within a predetermined RTT threshold time $T_{max}$. In example embodiments, the verifier stores the results of both these verification calculations for a subsequent authentication action.

In example embodiments, the signals 24 and 26 of the rapid bit exchange phase 123 and the corresponding prover device 102 actions of block 126 and verifier device 104 actions of blocks 124 and 128 are repeated k times (i.e. for i=1 to k), subject to the following two special cases. In one special case, in at least some example embodiments a special skip bit sb that is normally "0" is set to "1" in a randomly selected one of the intermediate FTM action messages 402 that are sent by the verifier 104 during the rapid bit exchange phase 123. In this regard, the verifier device 104 is configured to randomly select a $j^{th}$ FTM action message 402 of the k FTM action messages 402, where 1<j<k, and send out an alternative FTM frame signal 28 in which a skip bit field 406 is set to 1. The FTM action frame 402 sent when i=j in signal 28 includes a skip bit sb value in the skip bit challenge sub-field 406 (see FIG. 4) that has a different value when compared to the FTM action frames 402 sent in signal 24 when i≠j. By way of example, the skip bit challenge sub-field 406 may normally be set to "0" when i≠j and set to "1" when i=j.

As indicated in block 132, during the rapid bit exchange phase 123 the prover device 102 is configured to check each received FTM action frame 402 to check to see if the skip bit challenge sub-field 406 has been set to the skip bit (for example sb=1), and if so, the prover device 102 is configured to not send a corresponding FTM acknowledgment frame 302. As indicated in block 134, the verifier device 104 is similarly configured to monitor for and verify the absence of an FTM acknowledgment frame 302 after it has transmitted the sb containing FTM action frame 402 in signal 28. If an FTM acknowledgment frame 302 is received when i=j, it indicates that the prover device 102 is unaware of the existence of the skip bit and accordingly is a fraud.

Accordingly, inclusion of a skip bit sb in sub-field 406 in FTM action frame 402 at a random time during the rapid bit exchange phase 123 may, in at least some examples, provide low resource/low latency protection against a relay/replay/ man-in-the middle attack, especially in cases where the intervening device is unsophisticated.

In example embodiments, the second special case that occurs during the rapid bit exchange is at the end of the rapid bit exchange phase when the last challenge bit $c_{i=k}$ is sent from the verifier device 104 to the prover device 102. As noted above, the FTM action frame 402 includes a mutual authentication "B" challenge sub-field 408. In an example embodiment, the verification device is configured to populate the mutual authentication "B" challenge sub-field 408 when i=k and send alternative FTM frame signal 30 in place of FTM frame signal 24 as part of an additional verification phase 135. In this regard, in an example embodiment (see block 136) the challenge value "B" is calculated by applying the predefined keyed hash function h to a combination of the shared key K, the verifier device 104 medium access control (MAC) address $MAC_v$, the prover device 102 MAC address $MAC_p$, and combinations of each of the challenge bit-response bit pairs as represented, in one non-limiting example, by the relationship: $B=h(K,MAC_v\|MAC_p,c_1\oplus r_1, \|c_2\oplus r_2,\| \ldots \|c_k\oplus 0)$.

As indicated at block 138, upon receiving a FTM signal that includes an FTM action frame 402 containing a challenge value "B" in sub-field 408, the prover device 102 is configured to locally determine its own version of the challenge value B based on its own locally stored values and verify if the received challenge value "B" matches its own locally determined value. In the case of a match, the prover device 102 has improved confidence in the authenticity of the communications from verifier device 104 and can send a FTM acknowledgment frame 302 on signal 32 that conforms to the format used for prior FTM acknowledgment frames 302. However, in the case of a non-match, the prover device 102 has a decreased confidence in the authenticity of communications received from the verifier device 104 and may respond instead with a negative-acknowledgment version of FTM acknowledgement frame 302 in which the bits of the NACK subfield 308 are set to indicate a detected risk, shown illustrated by NACK=11 in FIG. 1.

In at least some examples the "B" challenge sub-field 408 can be included in a FTM action frame 402 sent at some other time that the last slot of the FTM rapid bit exchange phase. However, such a frame will have a reduced set of challenge/response bit pairs to rely on and including it the final time slot may, in some use cases, mitigate against time delaying effects that processing of "B" challenge sub-field 408 might otherwise have that could impact on the FTM parameters being gathered during the rapid bit exchange phase.

In at least some examples, the verification phase 135 adds a "proof of mutual knowledge" layer to the FTM exchange, providing a mutual authentication function between the verifier device 104 and prover device 102 that can mitigate against relay/reply/man-in-the middle type attacks.

As indicated at block 140, upon completion of the rapid bit exchange and verification phases 123, 135, the verifier device 104 is configured to decide whether to authenticate the prover device 102. In example embodiments, the authentication decision is based on evaluating the $\Delta T_i$ values, the number of correct response values $r_i$, whether an RTF acknowledgement frame was received when a sb bit was sent, and whether an valid RTF acknowledgement frame or a NACK frame was received in response to the "B" challenge value. In some embodiments, either a positive response to a sb bit or a NACK response to the "B" challenge value will result in a negative authentication decision regardless of the $\Delta T_i$ values or the number of correct response values $r_i$. In some examples, if the sb bit and "B" challenge value tests are passed, the verifier device 104 will proceed to authenticate based on the $\Delta T_i$ values and the number of correct response values $r_i$.

In practice, a number of the $r_i$ bits may not be correct (meaning the received response bit $r_i$ is not as expected). For example, an incorrect response $r_i$ bit could be the result of a corrupted challenge bit $c_i$ transmission or a corrupted response bit $r_i$ transmission. Accordingly, in at least some examples, the verifier device 104 will accept a prover device 102 as valid, if at least $\ell$ out of k received $r_i$ bits were correct. An attacker can guess at least $\ell$ out of the k response bits Ri right with a probability known as the false-accept probability ($\ell <=k$). An assumption is made that the attacker can "guess" the random location of the skip bit sb with a probability of ¼ and the last round ACK/NACK mechanism with a probability of ½. Accordingly, for at least some cases, the false accept probability can be assumed to be:

$$P_{false-accept} \leq \frac{1}{4} * \left(\frac{3}{4}\right)^{k-l}$$

The False-accept probability is very dependent on the number of FTM rounds (k), which in the above embodiment matches the size of nonce $N_{v,p}$. The greater the number of FTM bursts, the less the chance of a false-accept probability.

Figure 5:
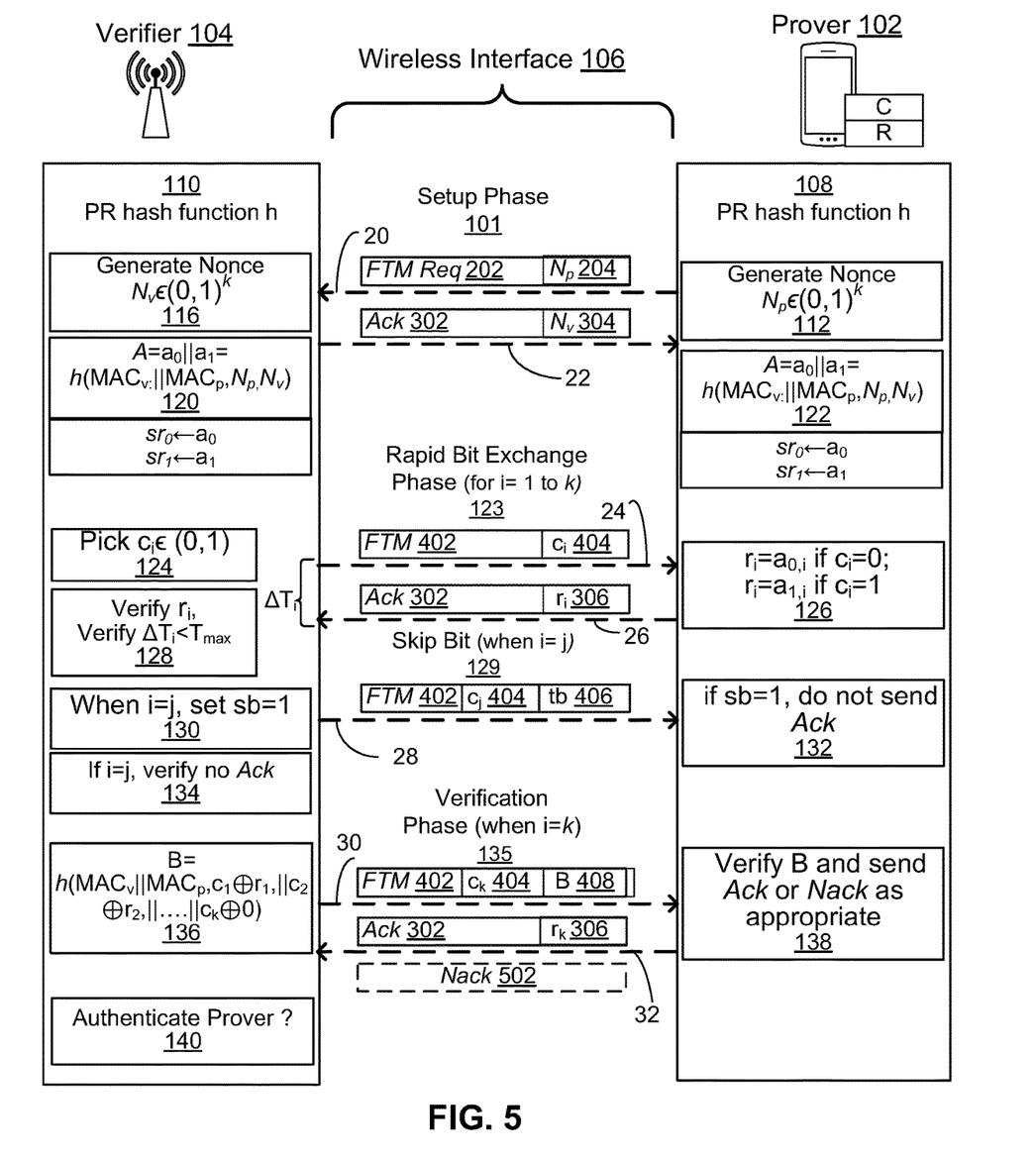
FIG. 5 is a signalling flow diagram illustrating signals exchanged between and actions taken at a verifier device and a prover device according to another example embodiment.

The example embodiments described above in respect of FIG. 1 assumed that the prover device 102 and verifier device 104 were associated and accordingly had a pre-shared secret key K. In at least some example embodiments the DB enabled FTM method and system is configured to be used with devices that are not pre-associated and thus do not have pre-shared key K. In this regard, FIG. 5 shows a further signaling flow diagram illustrating signals exchanged between and actions taken at a prover device 102 and a verifier device 104 that do not share a key K. The method illustrated in FIG. 5 is similar to that shown in FIG. 1 and described above except for the following differences. In particular, in the example of FIG. 5, the hash function h that is applied by the prover device 102 and the verification device 104 is not a keyed hash function but is instead a non-keyed pseudo-random (PR) hash function h. In such an embodiment, the prover device 102 and the verification device 104 are each preconfigured with the same non-keyed PR hash function h.

In at least some examples embodiments, the methods and systems described above can provide a computationally efficient solution to security against unauthorized attacks against devices that rely on FTM for localization.

Figure 6:
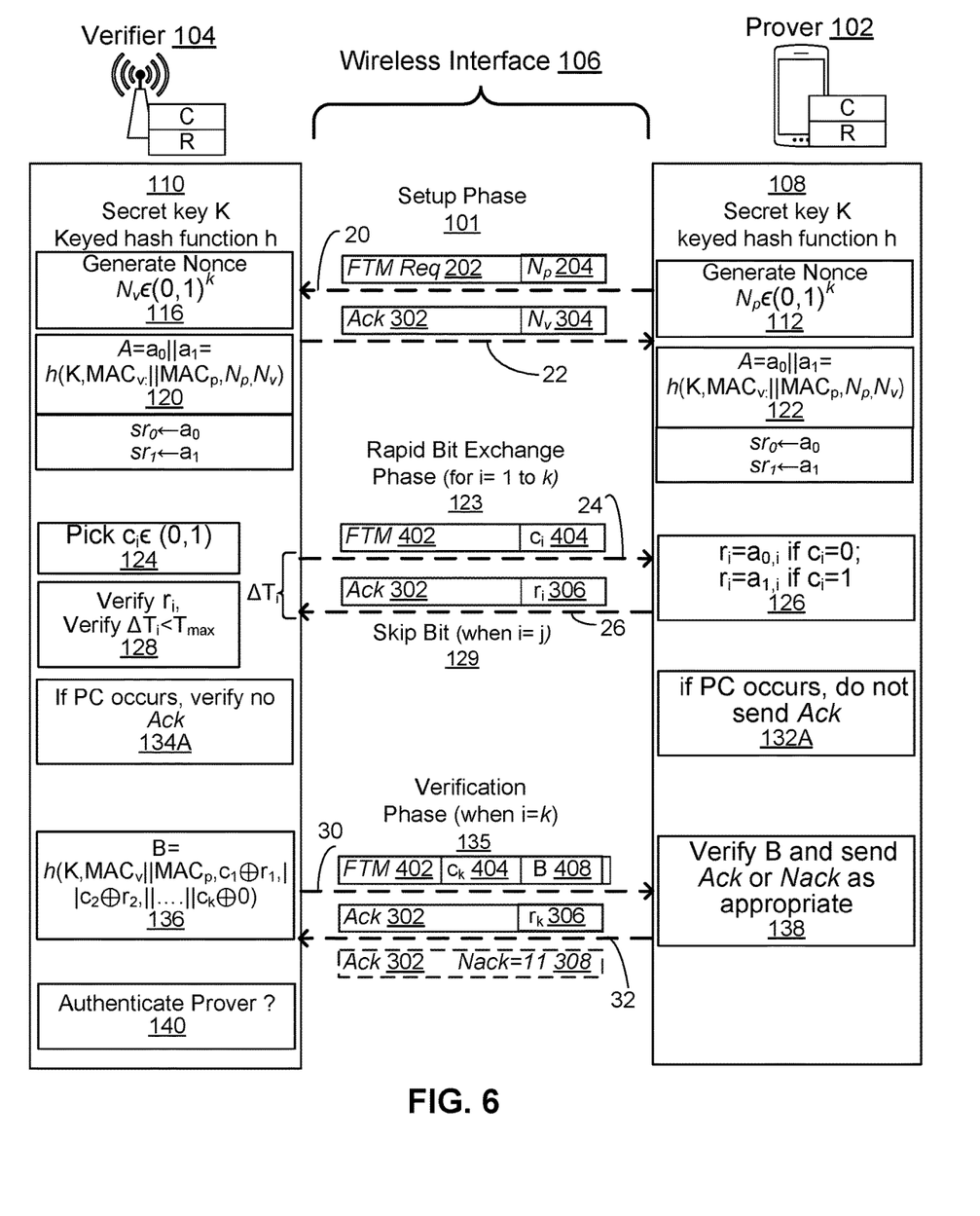
FIG. 6 is a signalling flow diagram illustrating signals exchanged between and actions taken at a verifier device and a prover device according to yet a further example embodiment.

In the example embodiments described above, the random inclusion of a skip bit sb in one of the FTM action frames 402 by the verifier device 104 is used to suppress an acknowledgement by the prover device 102. It is possible that in some use cases a more sophisticated attacking device could be configured to recognize the skip bit sb and act to override the effectiveness of the skip bit sb. Accordingly, in some example embodiments, other conditions are used instead of or in addition to skip bit in FTM action frame 402 to cause an FTM acknowledgement frame 302 to be skipped during the rapid bit exchange phase 123. In this regard, FIG. 6 shows a further signaling flow diagram illustrating signals exchanged between, and actions taken at, a prover device 102 and a verifier device 104. The method illustrated in FIG. 6 is similar to that shown in FIG. 1 and described above except that in the example of FIG. 6, a skip bit is not used during the rapid bit exchange phase 123, as indicated by the omission of blocks 130, 132 and 134 from FIG. 6.

In the embodiments previously described above, both the prover device 102 and verifier device 104 locally store a copy of the challenge bits $c_i$ and response bits $r_i$. In example embodiments such as shown in FIG. 6, the prover device 102 includes a shift register C to store the challenge bits $c_i$ that it receives and a shift register R to store the response bits $r_i$ that it sends. Similarly, verifier device 104 includes a shift register C to store the challenge bits $c_i$ that it sends and a shift register R to store the response bits $r_i$ that it receives. In example embodiments, when the contents of these shift registers meet a predetermined criterion, this acts a signal to the prover device 102 to skip an FTM acknowledgement frame 302 and to the verifier device 104 to not expect an FTM acknowledgement frame 302. For example, as indicated by block 132A in FIG. 6, when the predetermined criterion (PC) is detected, prover device 102 is configured to not send an FTM acknowledgement frame 302 for that round of the rapid bit exchange phase 123, and, as indicated by block 134A, the verifier device 104 is configured to verify that it does not receive an FTM acknowledgement frame 302 for that round.

An example of a predetermined criterion is illustrated with reference to FIG. 7 in the context of 4 bit shift registers C and R as follows. At each of prover device 102 and verifier device 104: shift registers C and R are initialized to 0 (action 602); during the first round i=1 of rapid bit exchange phase 123, challenge bit value (for example $c_1$=1) is added to right-most bit position of shift register C, and the corresponding response bit (for example $r_1$=0) is added to the right-most bit position of shift register R (action 604); during the second round i=2 of rapid bit exchange phase 123, challenge bit value (for example $c_2$=1) is added to right-most bit position of shift register C, and the corresponding response bit (for example $r_2$=0) is added to the right-most bit position of shift register R (action 606); the actions of pushing the $c_i$ bit into the right-most position of shift register C and the $r_i$ bit into the right-most position of shift register R continue until the shift registers collectively meet a predetermined criterion, which in the example of FIG. 7 occurs at i=n.

Figure 7:
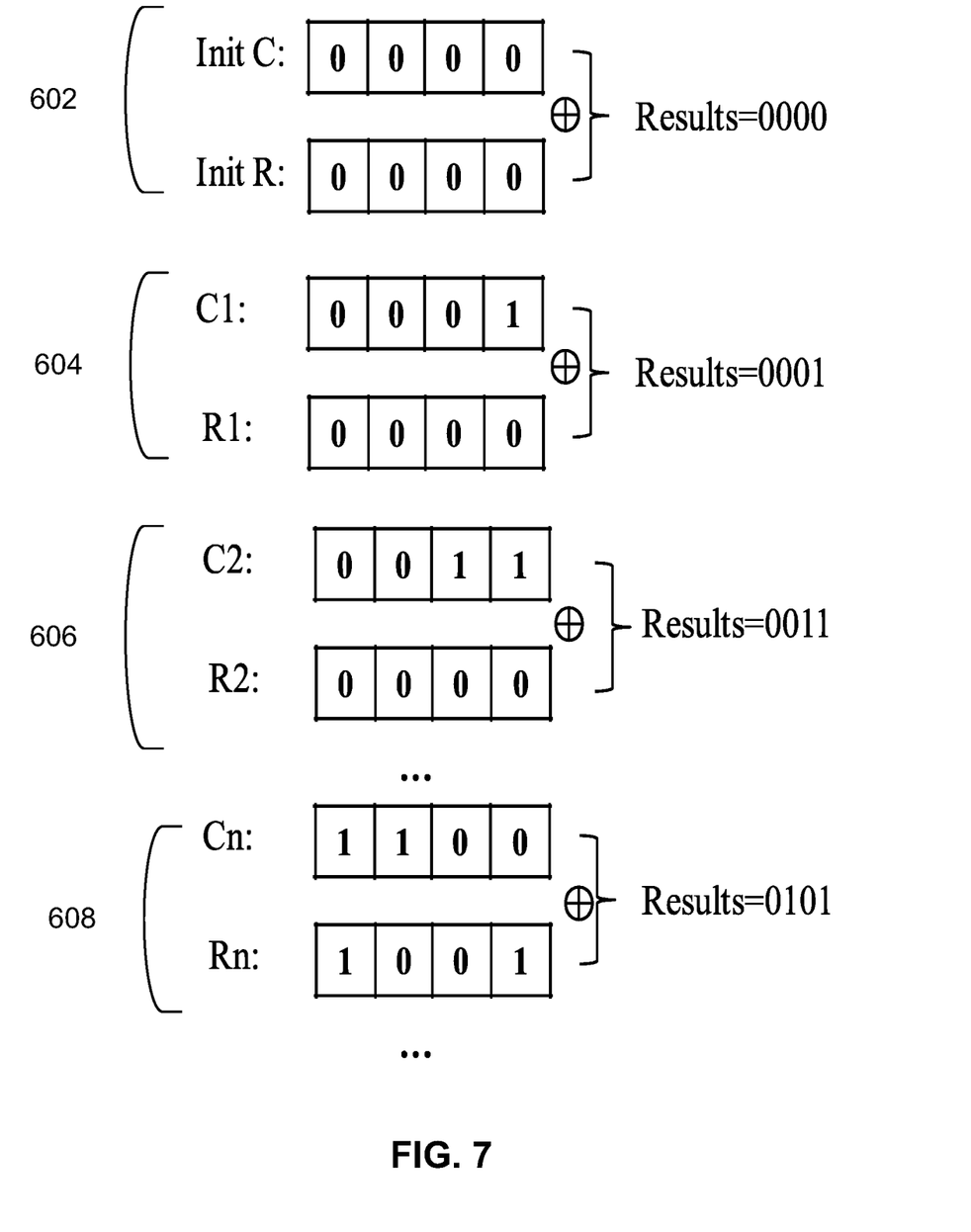
FIG. 7 shows the contents of shift registers at prover and verifying devices that are used to determine the occurrence of a random acknowledgment frame skip according to an example embodiment.

In the example of FIG. 7, the predetermined criterion is that when the shift registers R and C are XORd on a bit-wise basis the result will equal "0101". Both the prover device 102 and the verifier device 104 should have the same R and C register contents at the end of each round of the rapid bit exchange phase 132. Accordingly, the XOR result "0101" that is calculated locally at the prover device 102 is detected by the prover device 102 as a predetermined condition indicating that it should not send an FTM acknowledgment frame 302 in the next round. Similarly, the XOR result "0101" that is calculated locally at the verifier device 104 is detected by the verifier device 104 as a predetermined condition indicating that it should not expect a valid FTM acknowledgment frame 302 in the next round. In the example of FIG. 7, the chance of a skipped FTM acknowledgment frame 302 is 1/16.

Figure 8:
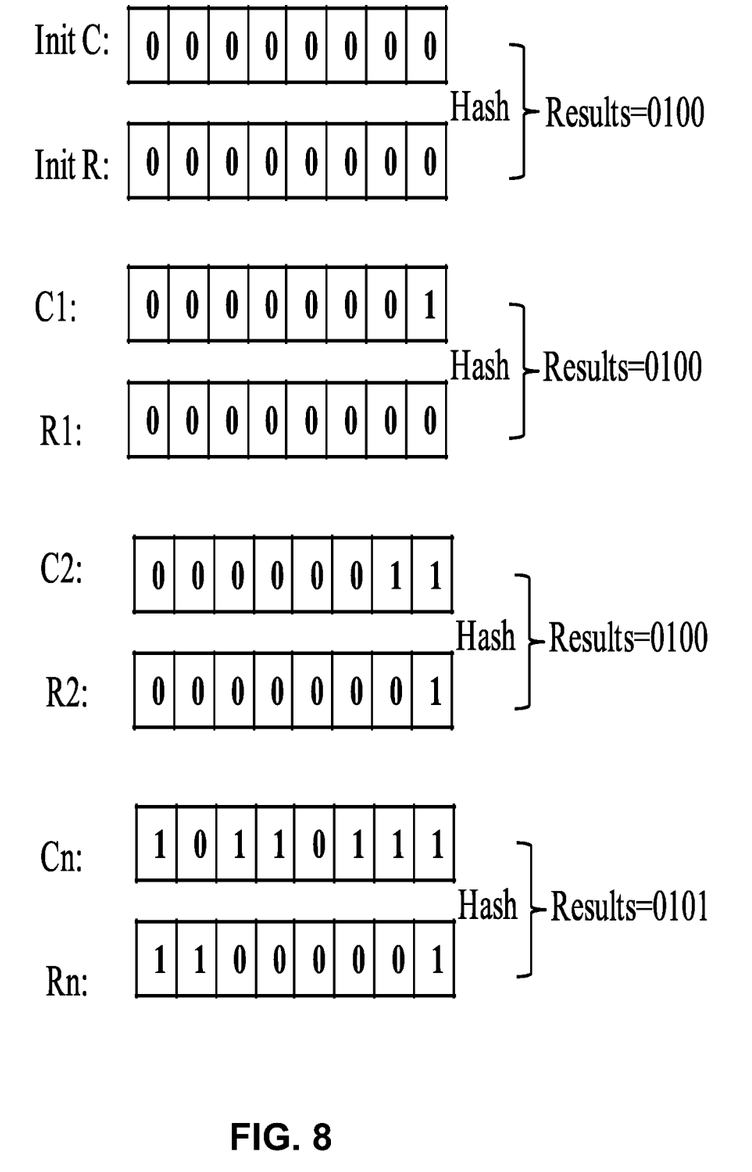
FIG. 8 shows the contents of shift registers at prover and verifying devices that are used to determine the occurrence of a random acknowledgment frame skip according to another example embodiment.

FIG. 8 illustrates a similar scheme as described above in FIG. 7, however in the example of FIG. 8 the R and C shift registers are 8-bit shift registers and the values of the shift registers are combined using a hash function, for example Result=Truncate-L4B(Hash (C,R)). If Result=0101, then both the prover device 102 and the verifier device 104 would be aware that the FTM acknowledgment frame 302 should be skipped in the next round.

The use of a skip bit sb, XOR calculation, or hash calculation to randomly trigger a skipped FTM acknowledgment frame can provide different properties as evidenced in the table below:

TABLE 1

| Random Skip | Skip Bit | XOR | Hashing |
|---|---|---|---|
| Delay | 0 | (about 5 cycles/round) | High (>20 ms) |
| Overhead on transmission | 1 bit/round (or 1 byte counting reserved bits) | 0 | 0 |
| Security Protection | Low (skip bit is easy to detect) | High (<=½) | High (<=½) |

In at least some examples, two or more of the methods shown in Table 1 can be combined to provide multiple skipped FTM acknowledgement frames during the rapid bit exchange phase 123.

Referring again to FIG. 3, as described above, the FTM acknowledgement frame 302 can be used for three different purposes. In one use case, FTM acknowledgement frame 302 is sent by the verifier device 104 in reply to an FTM Request frame 202, in which case the FDB nonce field 304 will be set to the nonce value Nv, and the Ri and NACK bit sub-fields 206, 308 will be 0. In a second use case, FTM acknowledgement frame 302 can be sent by the prover device 102 in reply to an FTM action frame 402, in which case the FDB Nonce field 304 will be set as 0s, and the Ri response bit field 306 will be set to Ri, and NACK field 308 is set to 01. In the third use case, FTM acknowledgement frame 302 can be sent by the verifier device 104 as a NACK to indicate a failed "B" challenge, in which case the FDB nonce field 304 will be set as 0s, the Ri bit 306 will 0, and NACK field 308 will be set as 11.

Figure 9:
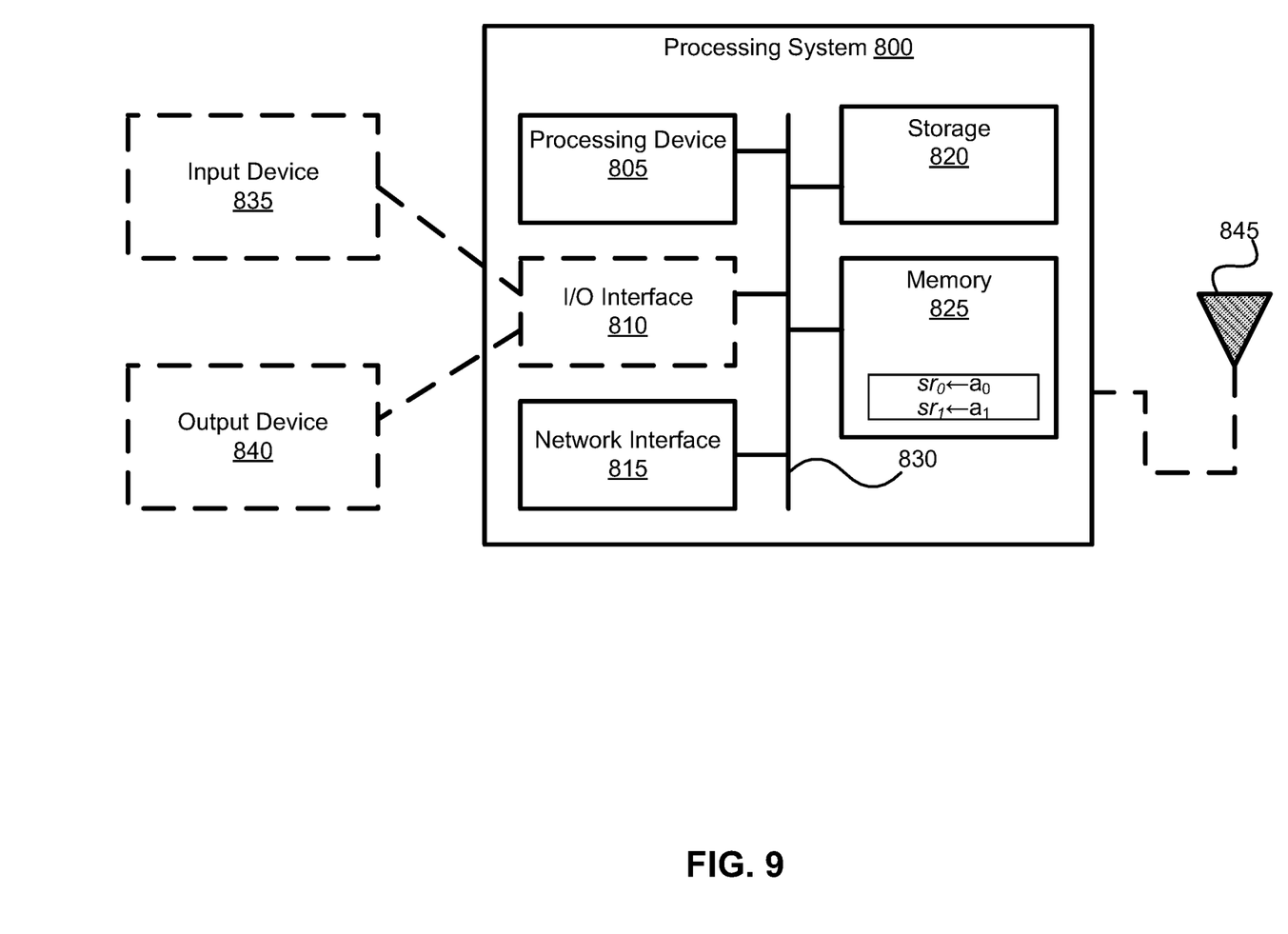
FIG. 9 is a schematic representation of a processing system used to implement an electronic device or network element in the system of FIG. 1.

FIG. 9 is a schematic diagram of an example processing system 800, which may be used to implement a prover device 102 or verifier device 104. The processing system 800 may be part of a mobile electronic device or a network element such as an access point, for example, or any suitable computing system. Other processing systems suitable for implementing examples described in the present disclosure may be used, which may include components different from those discussed below. Although FIG. 9 shows a single instance of each component, there may be multiple instances of each component in the processing system 800 and the processing system 800 could be implemented using parallel and/or distributed systems.

The processing system 800 may include one or more processing devices 805, such as a processor, a microprocessor, an application-specific integrated circuit (ASIC), a field-programmable gate array (FPGA), a dedicated logic circuitry, or combinations thereof. The processing system 800 may also include one or more optional input/output (I/O) interfaces 810, which may enable interfacing with one or more appropriate input devices 835 and/or output devices 840. The processing system 800 may include one or more network interfaces 815 for wired or wireless communication with a network (e.g., an intranet, the Internet, a P2P network, a WAN and/or a LAN) or other node. The network interfaces 815 may include one or more interfaces to wired networks and wireless networks. Wired networks may make use of wired links (e.g., Ethernet cable), while wireless networks, where they are used, may make use of wireless connections transmitted over an antenna such as antenna 845. The network interfaces 815 may provide wireless communication via one or more transmitters or transmit antennas and one or more receivers or receive antennas, for example. In this example, a single antenna 845 is shown, which may serve as both transmitter and receiver. However, in other examples there may be separate antennas for transmitting and receiving. In embodiments in which processing system is a network controller, such as an SDN Controller, there may be no wireless interface, and antenna 845 may not be present in all embodiments. The processing system 800 may also include one or more storage units 820, which may include a mass storage unit such as a solid state drive, a hard disk drive, a magnetic disk drive and/or an optical disk drive.

The processing system 800 may include one or more memories 825 that can include shift registers C, R, $sr_0$ and $sr_1$ which may include a volatile or non-volatile memory (e.g., a flash memory, a random access memory (RAM), and/or a read-only memory (ROM)). The non-transitory memories 825 (as well as storage 820) may store instructions for execution by the processing devices 805, such as to carry out methods such as those described in the present disclosure. The memories 825 may include other software instructions, such as for implementing an operating system (OS) and other applications/functions. In some examples, one or more data sets and/or modules may be provided by an external memory (e.g., an external drive in wired or wireless communication with the processing system 800) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 830 providing communication among components of the processing system 800. The bus 830 may be any suitable bus architecture including, for example, a memory bus, a peripheral bus or a video bus. Optionally, input devices 835 (e.g., a keyboard, a mouse, a microphone, a touchscreen, and/or a keypad) and output devices 840 (e.g., a display, a speaker and/or a printer) are shown as external to the processing system 800, and connected to optional I/O interface 810. In other examples, one or more of the input devices 835 and/or the output devices 840 may be included as a component of the processing system 800. Embodiments in which processing system 800 is a network controller may lack a physical I/O interface 810, and instead may be a so-called headless server for which all interactions are carried out through a connection to network interface 815.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

Certain adaptations and modifications of the described embodiments can be made. Therefore, the above discussed embodiments are considered to be illustrative and not restrictive. While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for authenticating an electronic device, comprising:

transmitting from a verifier device, through a wireless interface, a sequence of challenge bits for a prover device, each challenge bit being transmitted in a respective fine timing measurement (FTM) frame, wherein at least one of the respective FTM frames randomly includes a skip bit;

receiving, at the verifier device, FTM acknowledgment frames each including a response bit;

determining, for at least some of the received FTM acknowledgement frames, respective round trip time (RTT) measurements;

determining that a received FTM acknowledgement frame is unexpected if the received FTM acknowledgement frame is received in response to an FTM frame that includes a skip bit;

determining, for at least some of the received FTM acknowledgement frames, whether the included response bit matches a predicted response bit; and authenticating the prover device based on the determined RTT measurements, the determined response bit matches the predicted response bit, and determining if the received FTM acknowledgment frame is unexpected.

2. The method of claim 1 wherein the method further comprising:
determining that a received FTM acknowledgement frame is unexpected if predetermined criterion exist based on a current location in the sequence of challenge bits.

3. The method of claim 1 wherein the predicted response bit is calculated based on a keyed hash function combining a first nonce and a second nonce, wherein secret keys are shared between the verifier device and the prover device.

4. The method of claim 1 wherein the predicted response bit is calculated based on a pseudo-random hash function combining a first nonce and a second nonce, wherein the verifier device and the prover device are not pre-associated with secret keys.

5. The method of claim 1 comprising calculating at the verifier device a authentication challenge sequence based on at least some of the challenge bits and received response bits, and including the authentication challenge sequence in a designated field of one the FTM frames transmitted for the prover device, the method further including monitoring at the verifier device for a corresponding FTM acknowledgement frame.

6. The method of claim 1 wherein each response bit is stored using two shift registers, and the challenge bit of the respective FTM frame is used to identify one or the other of the shift registers.

7. The method of claim 1, comprising, prior to transmitting the sequence of challenge bits from the verifier device:
receiving at the verifier device, through a wireless interface, a fine timing measurement (FTM) request frame that includes a first nonce from the prover device; and
generating a second nonce and transmitting from the verifier device, through the wireless interface, the second nonce in an FTM acknowledgment frame for the prover device.

8. The method of claim 7 comprising calculating and storing at the verifier device the predicted response bit.

9. A processing system at a verifier device configured to authenticate a prover device, comprising:
a processing device;
a memory associated with the processing device;
a non-transient storage for storing instructions that when loaded to the memory and executed by the processing device cause the processing device to:
transmit, a sequence of challenge bits for the prover device, each challenge bit being transmitted in a respective fine timing measurement (FTM) frame, wherein at least one of the respective FTM frames randomly includes a skip bit;
receive FTM acknowledgment frames each including a response bit;
determine, for at least some of the received FTM acknowledgement frames, respective round trip time (RTT) measurements;
determine that a received FTM acknowledgement frame is unexpected if the received FTM acknowledgement frame is received in response to an FTM frame that includes a skip bit;
determine, for at least some of the received FTM acknowledgement frames, whether the included response bit matches a predicted response bit; and
authenticate the prover device based on the determined RTT measurements, the determined response bit matches the predicted response bit, and determine if the received FTM acknowledgement frame is unexpected.

10. A non-transitory machine readable medium having tangibly stored thereon executable instructions that, when executed by a processor of a verifier device cause the processor to perform a method of:
transmit, a sequence of challenge bits for a prover device, each challenge bit being transmitted in a respective fine timing measurement (FTM) frame, wherein at least one of the respective FTM frames randomly includes a skip bit;
receive FTM acknowledgment frames each including a response bit;
determine, for at least some of the received FTM acknowledgement frames, respective round trip time (RTT) measurements;
determine that a received FTM acknowledgement frame is unexpected if the received FTM acknowledgement frame is received in response to an FTM frame that includes a skip bit;
determine, for at least some of the received FTM acknowledgement frames, whether the included response bit matches a predicted response bit; and
authenticate the prover device based on the determined RTT measurements, the determined response bit matches the predicted response bit, and determine if the received FTM acknowledgement frame is unexpected.

11. A method for authenticating a prover device, comprising, at the prover device:
generating a first nonce and transmitting, through a wireless interface, the first nonce in a fine timing measurement (FTM) request frame for a verifier device;
receiving, through the wireless interface, an FTM acknowledgment frame that includes a second nonce from the verifier device;
calculating and storing at the prover device a predicted response sequence based on a combination of the first nonce and the second nonce;
receiving from the verifier device, through the wireless interface a sequence of FTM frames that each include a respective challenge bit;
transmitting FTM acknowledgment frames for the verifier device through the wireless interface, each FTM acknowledgement frame corresponding to one of the FTM frames and including a respective response bit selected from the predicted response sequence based on the challenge bit included in the corresponding FTM frame; and
not transmitting an FTM acknowledgement frame corresponding to an FTM frame upon detecting information in the FTM frame indicating that a corresponding FTM acknowledgement frame should not be sent.

12. The method of claim 11 wherein the information is indicated by a bit in the FTM frame.

13. The method of claim 11 comprising not transmitting an FTM acknowledgement frame corresponding to an FTM frame upon detecting an existence of predetermined criterion based on the received challenge bits and the response bits.

14. The method of claim 11 wherein the predicted response sequence is calculated based on a keyed hash function combining the first nonce and the second nonce, wherein a secret key is shared between the verifier device and the prover device.

15. The method of claim 11 wherein the predicted response sequence is calculated based on a pseudo-random hash function combining the first nonce and the second nonce, wherein the verifier device and the prover device are not pre-associated with secret keys.

16. The method of claim 11 comprising calculating at the prover device an authentication challenge sequence based on at least some of the challenge bits and response bits, and determining if the calculated authentication challenge sequence matches a sequence present in a designated field of one the FTM frames received from the verifier device.

17. The method of claim 11 wherein the respective response bit is stored using two shift registers, and the respective challenge bit is used to identify one or the other of the shift registers.

18. A processing system at a prover device, comprising:
a processing device;
a memory associated with the processing device;
a non-transient storage for storing instructions that when loaded to the memory and executed by the processing device cause the processing device to:
  generate a first nonce and transmit, through a wireless interface, the first nonce in a fine timing measurement (FTM) request frame for a verifier device;
  receive, through the wireless interface, an FTM acknowledgment frame that includes a second nonce from the verifier device;
  calculate and store at the prover device a predicted response sequence based on a combination of the first nonce and the second nonce;
  receive from the verifier device, through the wireless interface a sequence of FTM frames that each include a respective challenge bit;
  transmit FTM acknowledgment frames for the verifier device through the wireless interface, each FTM acknowledgment frame corresponding to one of the FTM frames and including a respective response bit selected from the predicted response sequence based on the challenge bit included in the corresponding FTM frame; and
  not transmit an FTM acknowledgement frame corresponding to an FTM frame upon detecting information in the FTM frame indicating that a corresponding FTM acknowledgement frame should not be sent.

19. A non-transitory machine readable medium having tangibly stored thereon executable instructions that, when executed by a processor of a prover device cause the processor to perform a method of:
  generating a first nonce and transmitting, through a wireless interface, the first nonce in a fine timing measurement (FTM) request frame for a verifier device;
  receiving, through the wireless interface, an FTM acknowledgment frame that includes a second nonce from the verifier device;
  calculating and storing at the prover device a predicted response sequence based on a combination of the first nonce and the second nonce;
  receiving from the verifier device, through the wireless interface a sequence of FTM frames that each include a respective challenge bit;
  transmitting FTM acknowledgment frames for the verifier device through the wireless interface, each FTM acknowledgment frame corresponding to one of the FTM frames and including a respective response bit selected from the predicted response sequence based on the challenge bit included in the corresponding FTM frame; and
  not transmitting an FTM acknowledgement frame corresponding to an FTM frame upon detecting information in the FTM frame indicating that a corresponding FTM acknowledgement frame should not be sent.

\* \* \* \* \*